(12) United States Patent
Crump et al.

(10) Patent No.: US 7,315,862 B1
(45) Date of Patent: Jan. 1, 2008

(54) CONCURRENT LOCK-FREE ACCESS TO A RECORD BY WRITE AND READ PROCESSES

(75) Inventors: Richard Crump, Boston, MA (US); Shekhar Kshirsagar, Lexington, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 453 days.

(21) Appl. No.: 10/327,587

(22) Filed: Dec. 20, 2002

(51) Int. Cl.
*G06F 17/30* (2006.01)

(52) U.S. Cl. ............................. 707/100; 707/1; 707/3; 707/6; 707/8

(58) Field of Classification Search ................ 707/3–7, 707/100
See application file for complete search history.

(56) References Cited

U.S. PATENT DOCUMENTS 5,918,229 A * 6/1999 Davis et al. .................. 707/10
6,047,283 A * 4/2000 Braun ........................... 707/3
6,240,418 B1 * 5/2001 Shadmon .................... 707/100
6,249,788 B1 * 6/2001 Ronstrom ................... 707/101
6,493,706 B1 * 12/2002 Mead et al. .................... 707/3
7,055,053 B2 * 5/2006 Saika ............................. 714/4

OTHER PUBLICATIONS

Farook, "fast lock-free linked lists in distributed shared memory systems", 1998, National library of Canada, pp. 1-67.*
Farook et al., "managing long linked lists using lick free techniques", 1998, Kluwer Academic Publishers, pp. 1-18.*

* cited by examiner

*Primary Examiner*—Don Wong
*Assistant Examiner*—Hanh Thai
(74) *Attorney, Agent, or Firm*—Guerin & Rodriguez, LLP; Michael A. Rodriguez

(57) ABSTRACT

Described are a system and method of providing simultaneous lock-free access by a write process and at least one read process to records. The records are organized according to a first search data structure and according to a second search data structure. When searching for a particular record, the search occurs along a search path determined by the first search data structure until a record is accessed that indicates that the first search data structure is in an intermediate state. The searching for the particular record then continues along a search path determined by the second search data structure in response to the record that indicates that the first search data structure is in an intermediate state.

21 Claims, 7 Drawing Sheets

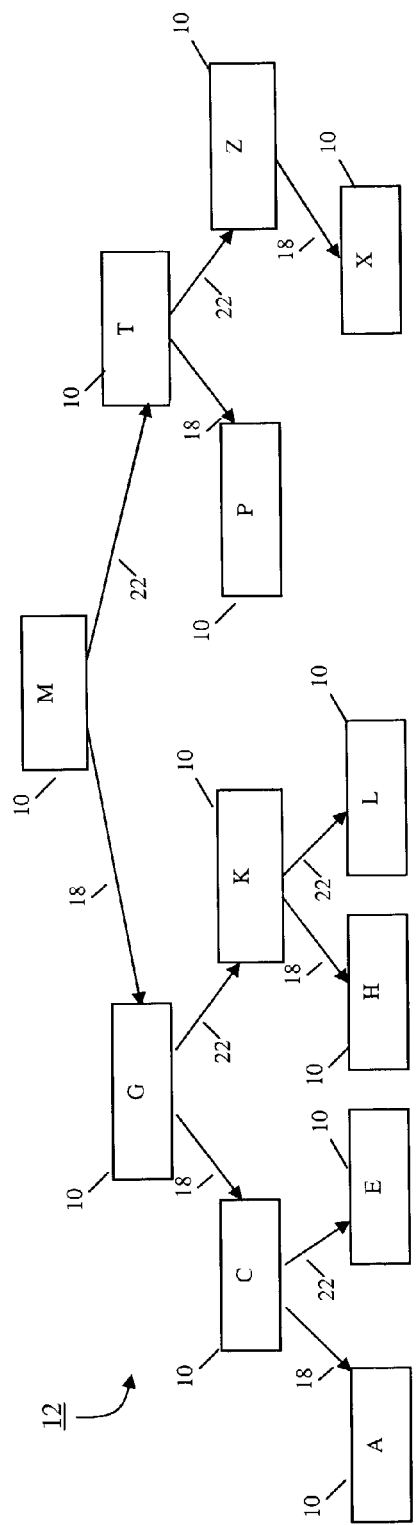
FIG. 1 - Binary Tree
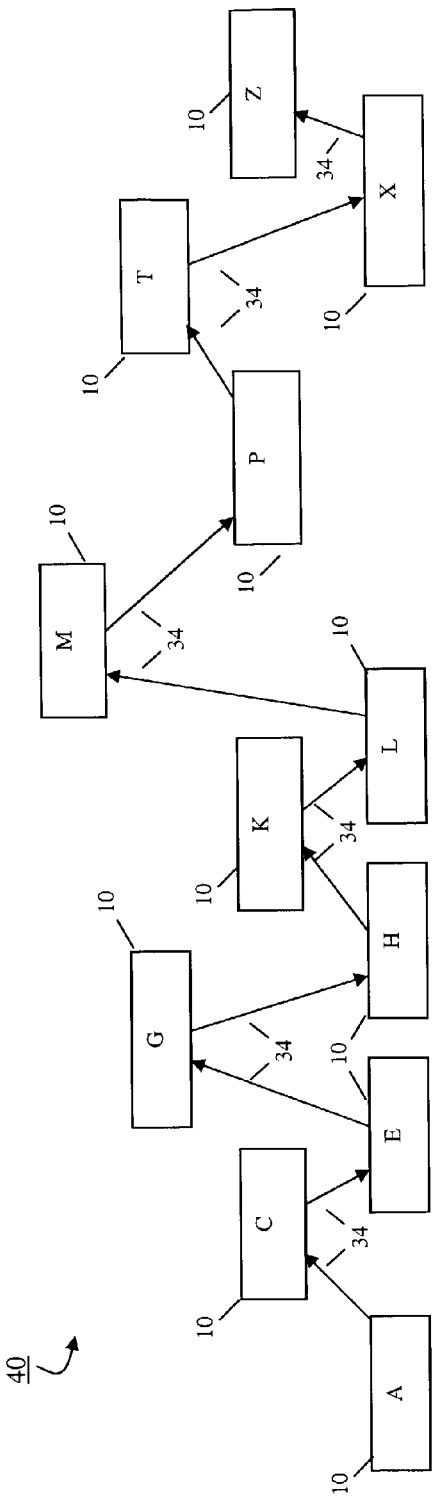
FIG. 3 (Next Pointers)

TO FIG. 4B

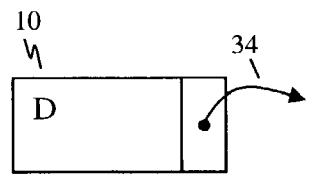

CONCURRENT LOCK-FREE ACCESS TO A RECORD BY WRITE AND READ PROCESSES

FIELD OF THE INVENTION

The invention relates generally to computing systems. More particularly, the invention relates to a system and method of providing a write process and one or more read processes concurrent lock-free access to a computing resource.

BACKGROUND

An important function performed by a computer system is to manage the resources, such as peripheral devices, an I/O port, memory, data structures, records, data, and files, allotted to a program or process while that process is running. Some resources are shareable among processes; that is, a process does not need mutually exclusive access to the resource to use it. The process uses the resource when needed and does not need to wait. Other resources are non-shareable; only one process can use that resource at a time. During that time, a mutually exclusive locking mechanism excludes all other processes from using the resource. If another process wants a busy resource, that process must wait until the resource becomes available.

Many data structures and searching programs manipulate records that are generally non-shareable between write and read processes. An example of such a data structure is an AVL (Adelson, Velskii, and Landis) tree. Programs that organize records in an AVL tree perform height-balancing operations after records are inserted or deleted from the tree. These balancing operations can cause incomplete (or intermediate) states to arise in the tree data structure. In computing environments having multiple central processing units (CPU) or running an operating system that uses preemptive scheduling, there can be several active processes vying for access to these records. In these environments, use of the AVL tree requires mutually exclusive locks to prevent processes from attempting to access a tree structure in an incomplete state. Consequently, these balancing operations can become a bottleneck and cause undesirable delays in process execution.

SUMMARY

In one aspect, the invention features a system for providing lock-free access to records in a database. The system comprises computer memory that stores a plurality of records organized according to a first search data structure and according to a second search data structure, and a processor that executes a computer program to search the computer memory for a particular record in the plurality of records. The computer program searches for the particular record (i) by accessing one or more records in an order determined by the first search data structure until a record is accessed that indicates that the first search data structure is in an intermediate state, and, in response to the record that indicates that the first search data structure is in an intermediate state, (ii) by accessing one or more records in an order determined by the second search data structure.

In another aspect, the invention features a computer-implemented method of providing lock-free access to records in a database. Records are organized according to a first search data structure and according to a second search data structure. A given record is searched for along a search path determined by the first search data structure until a record is accessed on the search path that indicates that the first search data structure is in an intermediate state. The given record is then searched for along a second search path determined by the second search data structure in response to the record that indicates that the first search data structure is in an intermediate state.

In another aspect, the invention features a method of inserting a record into a set of records organized according to a first search data structure and according to a second search data structure. An insertion location in a first search data structure is determined for the new record. The new record is inserted into the insertion location. An arrangement of the records in the first search data structure is modified in response to inserting the new record into the first search data structure. A flag is set when the first search data structure is in an intermediate state during the modifying of the arrangement of the records in the first search data structure.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 1 is a diagram illustrating one exemplary set of records that are organized according to a first search data structure, here an embodiment of a balanced binary tree.

FIG. 3 is a diagram illustrating the same exemplary set of records of FIG. 1 organized according to a second search data structure, here an embodiment of a linked list.

DETAILED DESCRIPTION

Figure 2:
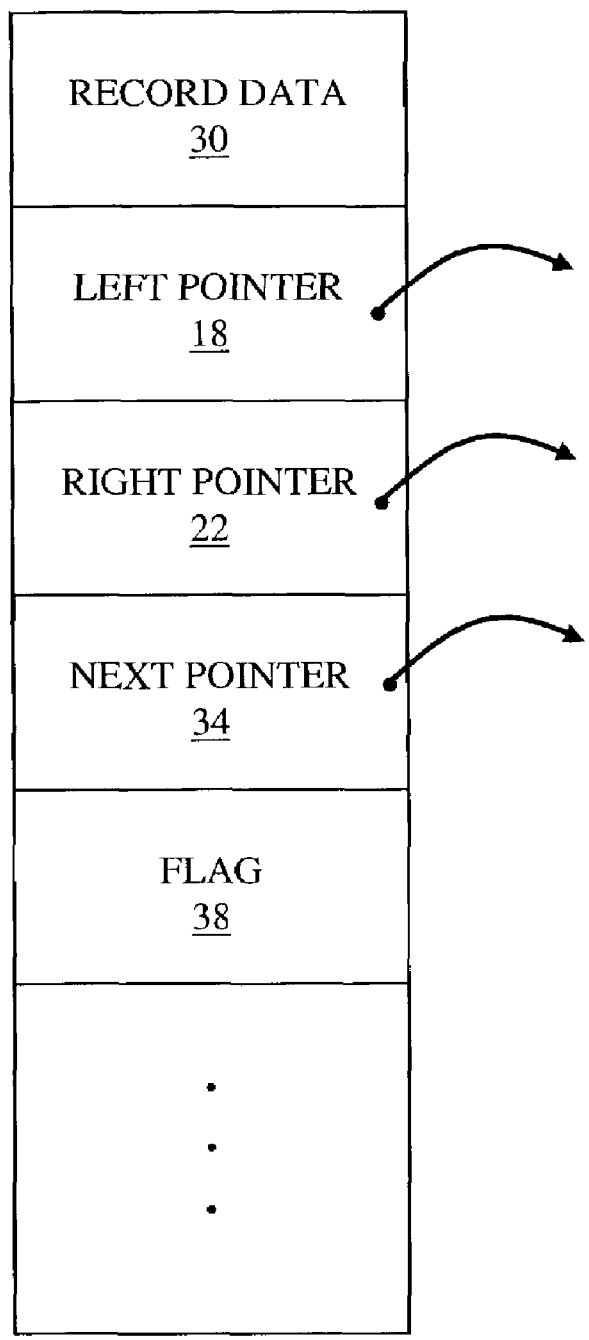
FIG. 2 is an embodiment of a search data structure for each record in the set of records.

The present invention features a system and method for enabling concurrent access to a plurality of records by a write process (or thread) and one or more read processes (or threads). As used herein, a write process is a program or part of a program that modifies the records (e.g., by adding a record to or deleting a record from the plurality of records) and a read process is a program or part of a program that accesses a record to read the record's contents without modifying that record. A thread is a process that is part of a larger process or program, and the term is used interchangeably with the term process without limiting the scope of the invention.

In brief overview, the records are organized according to at least two search data structures. A first or primary search data structure defines a plurality of search paths for traversing the plurality of records, and a second search data structure defines at least one alternative search path by which to traverse the records.

Of the two search data structures, the first search data structure is the one primarily used to search for records. However, a write process can cause the first search data structure to enter an intermediate state. If while traversing the first search data structure a read process reaches a record that indicates that the first search data structure is in an intermediate state, the searching ceases to use the first search data structure and resumes along an alternative path defined by the second search data structure. The second search data structure thus enables the read process to complete successfully without having to wait for the intermediate state to clear. In effect, the write and read processes manipulate the same record simultaneously; the write process using the first search data structure and the read process using the second search data structure.

Although the following description illustrates the invention using a binary tree as the first search data structure and a linked list as the second search data structure, it is to be understood that the principles of the invention apply also to other types of search data structures. Examples of search data structures that can be used for the first and second search data structures include, but are not limited to, binary trees (balanced or unbalanced), radix trees, graphs, and hash tables. In general, the principles apply to search data structures in which the records can be organized and searched according to the data of those records.

Examples of systems and machines that can employ the lock-free mechanism of the present invention include, but are not limited to, computer systems, data storage systems, databases, operating systems, routers, switches, virtual private networks, and firewalls.

FIG. 1 shows an example of a plurality of records 10 (or record set), stored in computer memory, and organized according to one embodiment of a first search data structure, here, a binary tree 12. The particular records 10 in this exemplary record set and the order in which the records are arranged in the binary tree 12 are shown here for the purpose of illustrating the principles of the invention, and their use is not intended to limit the scope of the invention to this particular record set or arrangement. The records 10 in the set can, for example, be records in a database or files in a file system. In general, each record 10 has data (referred to as record data or as a search key) by which the records can be arranged in an order and searched. In the example shown, the record data include an alphabetic label. For example, the root node of the binary tree 12 is the record 10 with the alphabetic label M. Other examples of record data include numeric data or alphanumeric data. Yet another example of record data includes an IP address prefix, which uses a dot notation (e.g., 128.100.56.0).

In the example of FIG. 1, records 10 that have a lower alphabetic label appear in a left sub-tree of the record M 10 and records that have a higher alphabetic label appear in the right sub-tree of the record M 10. This pattern of lower alphabetic labels in the left sub-tree and higher alphabetic labels in the right sub-tree applies also to the records at each lower level than the root node record (except for records that are leaf nodes, which have no sub-trees).

In the binary tree 12, each record 10 is linked to zero, one, or two other records by a left pointer 18, by a right pointer 22, by both left and right pointers, or by neither a left nor right pointer. In the particular example shown, the records 10 with alphabetic labels A, E, H, L, and X are leaf nodes in the binary tree 12. In one embodiment, the binary tree 12 is an AVL (Adelson, Velskii, and Landis) tree (i.e., a binary tree in which the difference in height between the left and right sub-trees (or root node) is less than or equal to one).

FIG. 2 shows an embodiment of a data structure for each record 10 of the present invention, including record data 30, a left pointer 18, a right pointer 22, a next pointer 34, and a flag 38. The record data 30 are the resource being managed and the means by which the records 10 are placed in an order within a search data structure, for example, within the binary tree 12 or within a linked list. The left pointer 18 and right pointer 22 provide the linkage for placing the record 10 in the binary tree 12 (FIG. 1). The next pointer 34 provides the linkage for placing the record 10 in a linked list, which is used for searching under circumstances in which the binary tree 12 is in an intermediate state. The flag 38 provides a mechanism for indicating that the first search data structure is in an intermediate state (as described in more detail below).

The following pseudo-code illustrates an example of a data structure for a record 10:

RECORD {
*left ptr; /* point to left child node in binary tree */
*right ptr; /* point to right child node in binary tree */
*next ptr; /* point to next node in linked list */
record_data; /* resource being managed */
flag; /* indicate a loop is created in the tree */
} RECORD The actual elements of a record 10 depend upon the type of search data structures used to organize the set of records. In this embodiment, the first search data structure is a binary tree and the second search data structure is a linked list. Here the binary tree provides a faster search mechanism than the linked list, but the slow search path of the linked list can be used as an alternative searching means because its use is expectedly seldom (i.e., as often as a read process attempts to access a particular sub-tree of the binary tree 12 while that sub-tree is in an intermediate state). In another embodiment, the second search data structure is a second binary tree instead of a linked list. For this embodiment, instead of a next pointer 34, each record 10 has a second left pointer and a second right pointer. These second left and right pointers are used to place the record in the second binary tree.

FIG. 3 shows the same example set of records 10 organized according to one embodiment of a second search data structure, here, a linked list 40. The records 10 are in the same relative position as shown in FIG. 1 to facilitate a comparison between the two search data structures. The linked list 40 organizes the records 10 in alphabetical order. The next pointer 34 of each record 10, except for the last record in the linked list 40, links that record 10 to a record that follows in the order. The next pointer 34 of the last record 10 in the linked list 40 (here, record Z) points to NULL (i.e., 0).

The second search data structure illustrated by the linked list 40 overlays the first search data structure; that is, the first and second search data structures each organize the same the set of records and together the search data structures provide alternative search mechanisms through the records. Further, the first and second search data structures use the same ranking or ordering of the records 10 based on their record data. For example, referring to the example set of records 10 in FIG. 1 and in FIG. 2, the first and second search data structures follow the alphabetical order in which the record data "A" is less than record data "C," and record data "C" is less than record data "E," and so on.

Figure 4A:
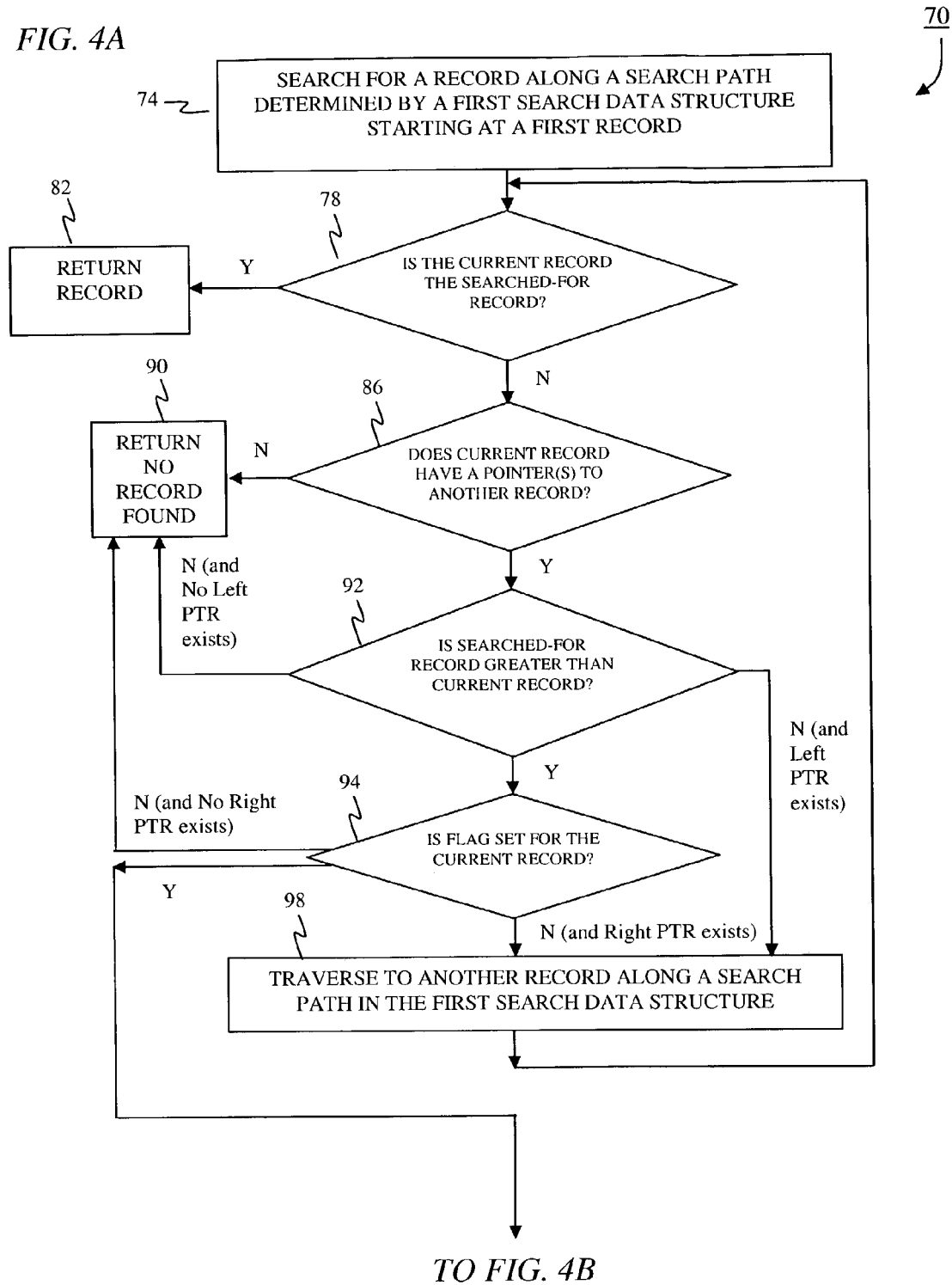
FIG. 4A and FIG. 4B are flow diagrams illustrating an embodiment of a method for searching for and obtaining a record from a set of records that are organized according to the first search data structure and according to the second search data structure in accordance with the principles of the invention.
Figure 4B:
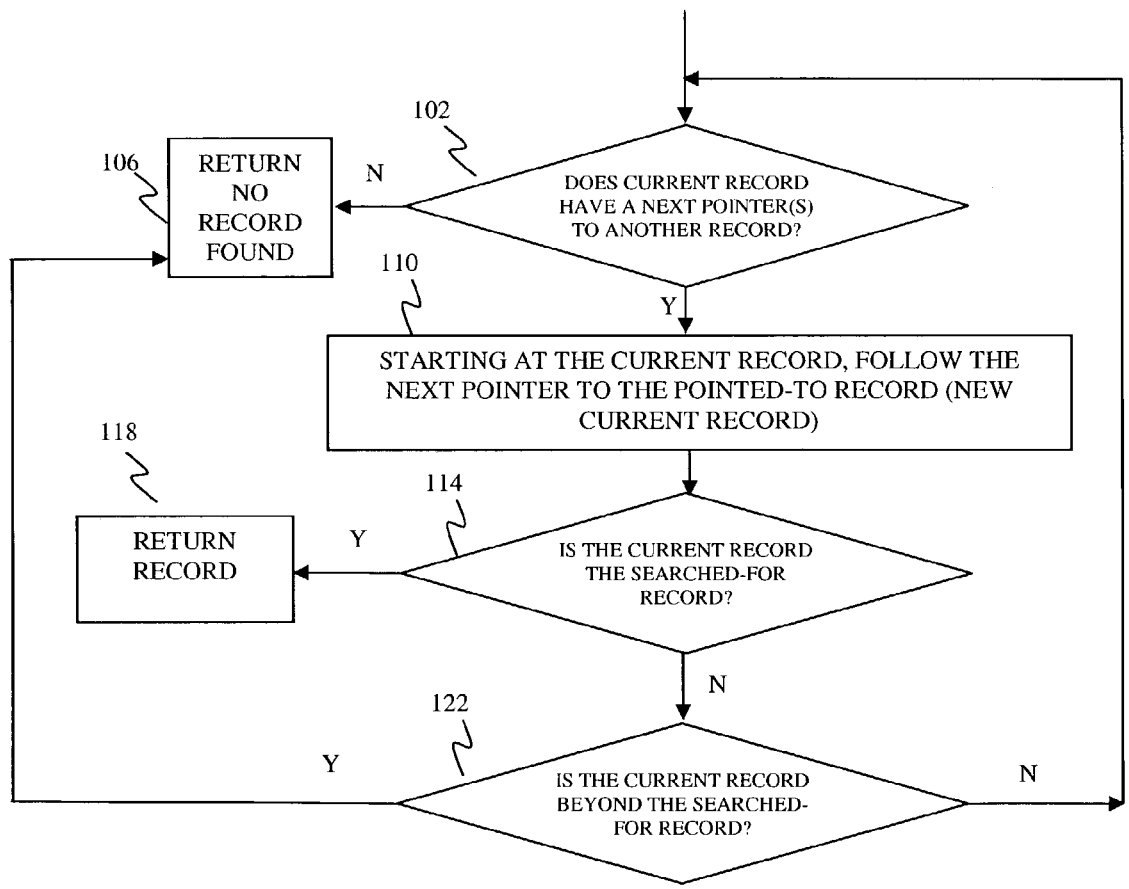

FIG. 4A and FIG. 4B show an embodiment of a method 70 performed by a computer system to search for a record in the set of records. The computer system can perform the method 70 for a variety of purposes, such as to respond to a database query, or to perform an IP address lookup for forwarding an IP packet. At step 74 the search commences at a record (i.e., the root node) in the set of records and traverses along a search path determined by the first search data structure. Hereafter, the record currently being visited is referred to as the "current record."

At step 78, it is determined whether the current record is the searched-for record. If so, the current record is returned (step 82). Otherwise, the computer system performing the method 70 (typically a processor of the computer system) determines (step 86) if the current record has a pointer that points to another record. If there are no pointers to other records, i.e., the left and right pointers are both NULL, no matching record is found (step 90).

If the current record points to another record, the processor determines (step 92) if the record data of the searched-for record is greater than the record data of the current record. No matching record is found (step 90) if the record data of searched-for record is not greater than the record data of the current record and the left pointer of the current record is NULL. If instead the left pointer points to another record (and the record data of the searched-for record is not greater than the record data of the current record), the search moves (step 98) to the record pointed to by the left pointer. The method 70 continues at step 78 for this new current record.

Alternatively, if the record data of the searched-for record is greater than the record data of the current record, the processor examines (step 94) the flag 38 of the current record to determine if the flag 38 is set. No matching record is found (step 90) if the flag 38 is not set and the right pointer of the current record is NULL. If the flag 38 is not set and the right pointer points to another record, the search moves (step 98) to the record pointed to by the right pointer, and the method 70 returns to step 78 for this new current record.

If, instead, at step 94 above, the flag 38 of the current record is set, this indicates that the first search data structure is in an intermediate state. Before the present invention, access to this current record would have been locked because a write process has caused a sub-tree of the current record to be in an intermediate state. However, the present invention enables the current record to remain available to other read processes without using a lock. More specifically, the search ceases to use the first search data structure to determine the search path and uses an alternative search path provided by the second search data structure. At step 102, the method 70 determines if the next pointer 34 of the current record points to another record. If the next pointer 34 is NULL (i.e., does not point to another record), in one embodiment the search returns (step 106) that no record is found. If the next pointer 34 points to another record, at step 110 the search follows the next pointer 34 of the current record to that other record (the new current record). The search then determines (step 114) if the new current record is the searched-for record. If so, the search returns the current record (or its record data value) to the calling process (step 118). If not, the search determines (step 122) whether the record data of the new current record are beyond the record data of the searched-for record (i.e., higher in order), because then there is no need to continue searching; the searched-for record is not in the sub-tree. Accordingly, in one embodiment the method indicates to the calling process that no matching record is found (step 106).

If instead the next pointer 34 points to a record that is not the searched-for record (step 114), but that record is less in order than the searched-for record (step 122), then the search continues (step 102) along the search path of the second search data structure using the next pointer 34 of the current record to traverse to the next record, if any, in the linked list 40.

Referring to FIG. 1 and FIG. 2, consider for example a search for the record L 10 (FIG. 1). Consider also that the record G 10 has a set flag 38 because the right sub-tree of record G 10 is in an intermediate state. For the binary tree 12 of FIG. 1, the search begins at the root node, here the record M 10. Because the record M 10 is not the searched-for record, the search continues along a search path determined by the binary tree 12. Accordingly, because the searched-for record L 10 is less than the current record (i.e., record data "L"<record data "M"), the search traverses to the left sub-tree to the record G 10.

Because the record G 10 is not the searched-for record and the flag 38 of record G 10 is set, the search continues from record G 10 using the second search data structure, which in this example is the linked list 40. The search path follows the next pointer 34 of the record G 10 to the record H 10, the next pointer 34 of record H 10 to the record K 10, and then the next pointer 34 of record K 10 to the searched-for record L 10.

Inserting a new record into a record set typically involves updating the left, right and next pointers of some records already in the record set and of the new record. A record insertion can also require a rebalancing of the binary tree (i.e., for embodiment in which the binary tree is an AVL tree). Operations to balance the binary tree include left-rotate and right-rotate tree operations. At any step during the insertion of a record or during the rebalancing of the binary tree, an interruption can occur (e.g., a different process gains control of the CPU and there is a context switch). So that each record remains accessible by a read process despite the interruption, the updating of the record pointers during insertion and rebalancing operations occurs in a particular order.

Figure 5:
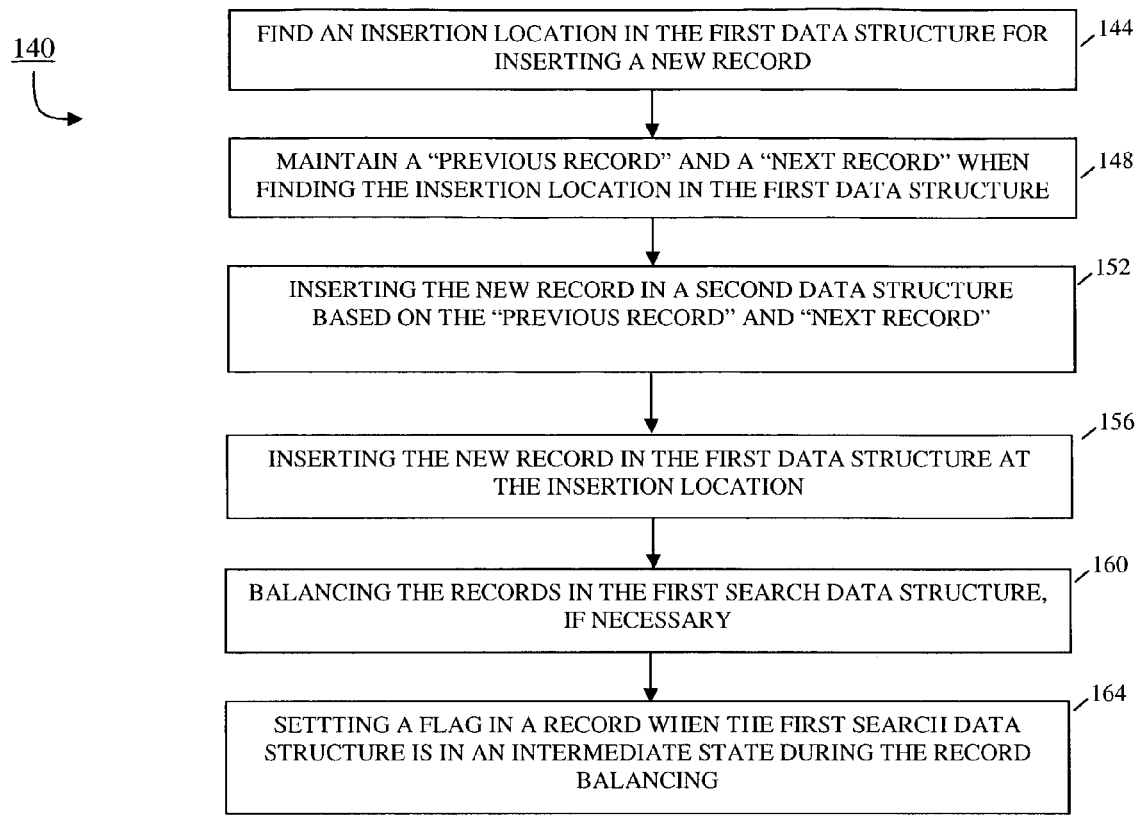
FIG. 5 shows a flow chart of a method for inserting a record into the exemplary set of records in accordance with the principles of the invention.

FIG. 5 shows an embodiment of a method 140 of inserting a record into a set of records and of rebalancing the binary tree 12 in accordance with the principles of the invention. At step 144 the binary tree is traversed to find an insertion location for the new record. During the traversal of the binary tree, the identities of a current "previous record" and of a current "next record" are maintained (step 148). When the traversal moves to a record in a right sub-tree, the method 140 updates the current "previous record" to be the record just visited (i.e., the record from which the traversal just moved). When the traversal moves to a record in a left sub-tree, the method 140 updates the current "next record" to be the record that is currently being visited.

After finding the insertion location for the new record, the method 140 inserts the new record into the linked list (step 152) by setting the next pointer of the new record to point to the current "next record" and the next pointer of the "previous record" to point to the new record.

Figure 6A:
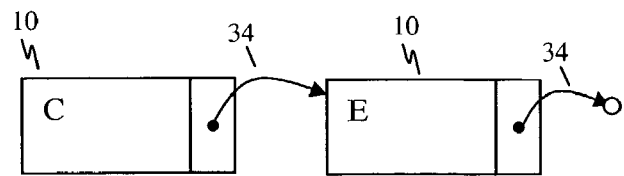
FIG. 6A, FIG. 6B, and FIG. 6C are block diagrams illustrating an embodiment of a method for inserting a new record into the second search data structure without employing a lock mechanism in accordance with the principles of the invention.
Figure 6B:
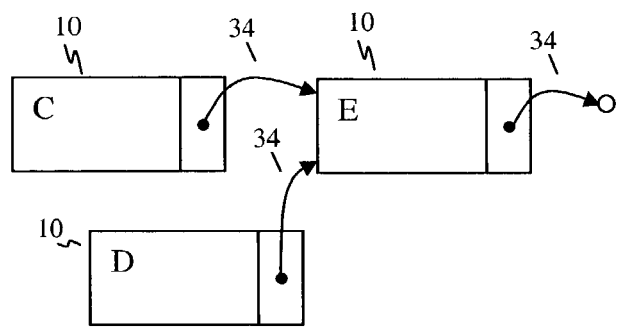
Figure 6C:
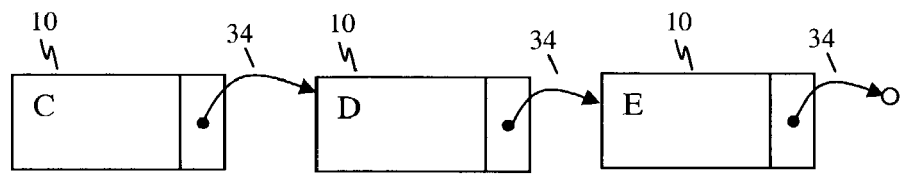

FIG. 6A, FIG. 6B, and FIG. 6C illustrate a sequence for inserting the new record into the linked list so as not to require a lock mechanism. FIG. 6A shows the linking between record C 10 and record E 10 before record D is inserted. The next pointer 34 of record C 10 points to the record E 10. The record D 10 is initialized and presently unlinked to any record.

In FIG. 6B, the next pointer 34 of the new record D 10 is then set to point to the record E 10. The next pointer 34 of record C 10 continues to point to record E 10. Interruption of the insertion process at this moment thus does not affect the ability to follow the next pointer 34 of record C 10 to record E 10. In FIG. 6C, the next pointer 34 of record C 10 is changed to point to the new record D 10, thus completing the insertion of the new record D into the linked list. Returning to FIG. 5, the new record D 10 is then inserted (step 156) into the binary tree 12 at the insertion location. The insertion of the new record D 10 into the binary tree 12 occurs after its insertion into the linked list to ensure that the alternative search path of the linked list is stable and available for use should the insertion of the new record D 10 into the binary tree 12 be interrupted.

After the new record D 10 is inserted into the binary tree 12, the binary tree 12 may require rebalancing (step 160). In the course of rebalancing the binary tree 12, the binary tree 12 may enter an intermediate state (i.e., the balancing is incomplete and binary tree 12 does not have its proper structure). Before entering this intermediate state, a flag is set (step 164). If an interruption of the rebalancing occurs now, at least one record of the binary tree 12 indicates the intermediate state. Consequently, if a read process subsequently accesses that record with the set flag, the read process can continue searching through the records using the alternative search data structure as described herein.

Figure 7A:
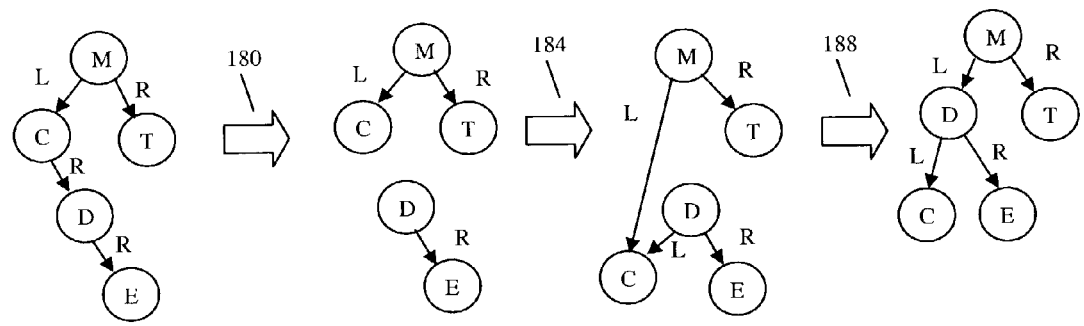
FIG. 7A and FIG. 7B are diagrams illustrating embodiments of left-rotate and right-rotate operations, respectively, used to balance a binary tree in accordance with the principles of the invention.
Figure 7B:
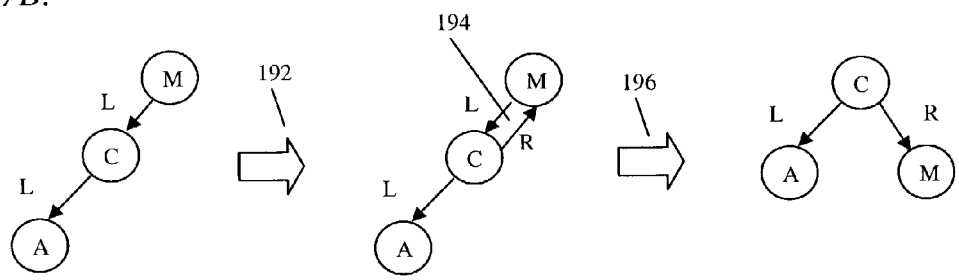

Tree operations associated with balancing the binary tree include a left-rotate operation and a right-rotate operation. FIG. 7A shows an example of the left-rotate tree operation; FIG. 7B of the right-rotate tree operation. In FIG. 7A and FIG. 7B, the number of records are reduced from those shown in FIG. 1 to simplify the description. Left-rotate operations and right-rotate operations can place the binary tree in an intermediate state. Left-rotate operations can isolate right sub-trees from the binary tree search data structure. Right-rotate operations can also isolate right sub-trees from the binary tree search data structure and generate loops between records.

The sequence in which record pointers are updated during these tree operations is important to ensure that the left sub-tree of the tree does not become inaccessible because of a process interruption. When the left sub-tree remains accessible, a search process is certain to reach a searched-for record, if it is in the set of records, by traversing a left sub-tree(s) of the binary tree, by following one or more next pointers, or by a combination of traversing left sub-tree(s) and next pointer(s). Accordingly, when a search process reaches a current record with a set flag, indicating that the tree is in an intermediate state, the search process can continue with the linked list, if the searched-for record has a greater data value than the current record, or with the left sub-tree, if the searched-for record has a lesser data value than the current record.

For FIG. 7A, consider for example a left-rotate operation around the record C. As a first step (represented by an arrow 180), the right pointer of the record C is set equal to the left pointer of the record D, which is shown to be NULL. This change isolates records D and E from the binary tree. Accordingly, the flag 38 of record C is set to indicate that the binary tree is in an intermediate state. Should an interruption occur that temporarily leaves the binary tree in this intermediate state, the record D (and also record E) can still be accessed, though apparently isolated from the binary tree, by following the next pointer 34 from record C.

The left pointer of record D is then set to point to record C (arrow 184), and the left pointer of the root record M is set to point to the record D (arrow 188) to complete the rebalancing of the tree. In general, so that the left sub-tree of the tree remains accessible, the last pointer that is updated to complete the rebalancing is the pointer of the parent (or the pointer to the root node), here record M. If an interruption occurs after the record D points to record C, the records D and E are still isolated. Notwithstanding, both records D and E are reachable by traversing the left sub-tree (i.e., from record M to record C) and then by following the next pointers 34 from record C to record D. After record D is no longer isolated, the flag 38 previously set in record C is cleared.

FIG. 7B shows a right-rotate operation around the root record M. In this simple example, the left pointer of the record M points to the record C, and the left pointer of the record C points to the record A. For right-rotate operations, the first update is to the pointer of the parent (or to the pointer to the root node) to keep the left sub-tree of the binary tree accessible. In this example, the root node pointer changes to point to record C (arrow 192).

Then the right pointer of record C changes to point to the record M, thus creating a loop 194 between the records C and M. Accordingly, the flag 38 of record C is set to indicate that the binary tree is in an intermediate state. If an interruption occurs now that temporarily leaves the binary tree in this intermediate state, the record A is still accessible by following the left pointer 34 from the record C. The left pointer of record M is then set to NULL, thus removing the loop and completing the right-rotate operation (arrow 196). Clearing the flag 38 of the record C follows the removal of the loop.

While the invention has been shown and described with reference to specific preferred embodiments, it should be understood by those skilled in the art that various changes in form and detail may be made therein without departing from the spirit and scope of the invention as defined by the following claims.

What is claimed is:

1. A system providing lock-free access to records in a database, the system comprising:
    computer memory storing a plurality of records organized according to a first search data structure and according to a second search data structure, the first search data structure organizing the plurality of records according to the same ranking of records used by the second search data structure to organize the plurality of records; and
    a processor executing a computer program to search the computer memory for a particular record in the plurality of records, the computer program searching for the particular record by accessing one or more records in an order determined by the first search data structure until a record is accessed that indicates that the first search data structure is in an intermediate state, and, in response to the record that indicates that the first search data structure is in an intermediate state, switching to use of the second search data structure to search for the particular record by accessing one or more records in an order determined by the second search data structure, wherein use of the second search data structure to search for the particular record commences at the record that indicates the first search data structure is in the intermediate state.

2. The system of claim 1, wherein the first search data structure is a binary tree and the second search data structure is a linked list.

3. The system of claim 1, wherein each record includes a next pointer that is used to organize the records in the second search data structure.

4. The system of claim 1, wherein each record includes a flag field that is used to indicate whether the first search data structure is in an intermediate state.

5. The system of claim 1, wherein the first data structure is in the intermediate state if a portion of the first search data structure becomes isolated from the first search data structure.

6. The system of claim 1, wherein the first data structure is in the intermediate state if a plurality of records in the first search data structure forms a loop.

7. The system of claim 1, wherein each record includes a pointer that is used to organize the records in the second search data structure and a flag field that is used to indicate whether the first search data structure is in an intermediate state.

8. The system of claim 1, wherein accessing records in the order determined by the second search data structure starts at the record that indicates that the first search data structure is in an intermediate state.

9. A computer-implemented method of providing lock-free access to records in a database, the method comprising:
organizing the records according to a first search data structure and according to a second search data structure, the first search data structure organizing the records according to the same ranking of records used by the second search data structure to organize the records;
searching for a given record along a search path determined by the first search data structure until a record is accessed on the search path that indicates that the first search data structure is in an intermediate state; and
searching for the given record along a second search path determined by the second search data structure in response to the record that indicates that the first search data structure is in an intermediate state, wherein the searching along the second search path determined by the second search data structure commences at the record that indicates the first search data structure is in the intermediate state.

10. The method of claim 9, wherein the step of searching for the given record on the search path determined by the second search data structure starts at the record that indicates that the first search data structure is in an intermediate state.

11. The method of claim 9, further comprising modifying the organization of records according to the first search data structure to place the first search data structure in the intermediate state.

12. A computer-implemented method of inserting a new record into a set of records organized according to a first search data structure and according to a second search data structure, the method comprising:
ranking the records in the set of records according to their record data;
ordering the records in the first search data structure and in the second search data structure based on this ranking of the records, the records being ordered within the first search data structure according to the same ranking by which the records are ordered within the second search data structure;
determining for the new record an insertion location in the second search data structure;
inserting the new record into the insertion location in the second data structure;
modifying an arrangement of the records in the first search data structure in response to inserting the new record into the second search data structure; and
setting a flag in one of the records in the set of records when the first search data structure is in an intermediate state during the modifying of the arrangement of the records in the first search data structure.

13. The method of claim 12, further comprising determining an insertion location for the new record in the second search data structure by identifying a previous record and a next record during the step of determining an insertion location in the first search data structure.

14. The method of claim 13, wherein the first search data structure is a binary tree, the step of determining the insertion location in the first search data structure includes traversing the binary tree, and the step of identifying the previous record includes updating a current previous record whenever the traversing moves to a record in a right sub-tree of the binary tree.

15. The method of claim 13, wherein the first search data structure is a binary tree, the step of determining the insertion location in the first search data structure includes traversing the binary tree, and the step of identifying the next record includes updating a current next record when the traversing moves to a record in a left sub-tree of the binary tree.

16. The method of claim 12, wherein the first search data structure is a binary tree, and further comprising performing a left-rotate operation to balance the binary tree after inserting the new record in the insertion location in the first search data structure, and maintaining a pointer to a left sub-tree of the binary tree throughout the performing of the left-rotate operation.

17. The method of claim 12, wherein the first search data structure is a binary tree, and further comprising performing a right-rotate operation to balance the binary tree after inserting the new record in the insertion location in the first search data structure, and maintaining a pointer to a left sub-tree of the binary tree throughout the performing of the right-rotate operation.

18. The method of claim 12, wherein the flag is set when the step of modifying produces a loop between records in the first search data structure.

19. The method of claim 12, wherein the flag is set when the step of modifying isolates a subset of the records from other records in the first search data structure.

20. The system of claim 1, wherein each record of the plurality of records has record data, the record data of the records determining the ranking of the records.

21. The method of claim 9, further comprising the step of ranking the records according to their record data.

* * * * *